(12) United States Patent
Schneck et al.

(10) Patent No.: US 10,570,596 B1
(45) Date of Patent: Feb. 25, 2020

(54) DRAIN PIPE CLEANER PLUMBING TOOL

(71) Applicants: Steve Schneck, Overland Park, KS (US); Paul Gerber, Overland Park, KS (US)

(72) Inventors: Steve Schneck, Overland Park, KS (US); Paul Gerber, Overland Park, KS (US)

( * ) Notice: Subject to any disclaimer, the term of this patent is extended or adjusted under 35 U.S.C. 154(b) by 291 days.

(21) Appl. No.: 15/451,828

(22) Filed: Mar. 7, 2017

Related U.S. Application Data

(60) Provisional application No. 62/308,676, filed on Mar. 15, 2016.

(51) Int. Cl.
| | |
|---|---|
| *E03C 1/302* | (2006.01) |
| *E03C 1/26* | (2006.01) |
| *E03C 1/264* | (2006.01) |
| *E03F 9/00* | (2006.01) |
| *E03C 1/262* | (2006.01) |
| *E03C 1/30* | (2006.01) |
| *B08B 9/027* | (2006.01) |
| *A47K 1/14* | (2006.01) |
| *B25J 1/02* | (2006.01) |

(52) U.S. Cl.
CPC ............ *E03C 1/302* (2013.01); *A47K 1/14* (2013.01); *B08B 9/027* (2013.01); *B25J 1/02* (2013.01); *E03C 1/26* (2013.01); *E03C 1/262* (2013.01); *E03C 1/264* (2013.01); *E03C 1/30* (2013.01); *E03F 9/002* (2013.01)

(58) Field of Classification Search
CPC . E03C 1/26; E03C 1/262; E03C 1/264; E03C 1/30; E03C 1/302; B08B 9/02; B08B 9/027; B08B 9/04; E03F 9/002; E03F 9/005; A47K 1/14; B25J 1/02
USPC ........ 15/104.31–104.33; 4/255.01, 286, 287, 4/290, 292, 295, DIG. 14; 294/93, 94, 294/100
See application file for complete search history.

(56) References Cited

U.S. PATENT DOCUMENTS

| | | | | |
|---|---|---|---|---|
| 1,377,933 | A * | 5/1921 | Sheatsley | E03C 1/302 15/104.32 |
| 1,457,198 | A * | 5/1923 | Utley | B25B 9/00 15/104.32 |
| 1,467,772 | A * | 9/1923 | Appelhoff | E03C 1/264 4/291 |
| 1,730,083 | A * | 10/1929 | Melfi | E03C 1/264 4/292 |
| 2,116,651 | A * | 5/1938 | Ackerson | A47G 21/10 294/100 |
| 2,212,013 | A * | 8/1940 | Devareaux | A47J 43/283 294/100 |
| 2,320,967 | A * | 6/1943 | Dunkelberger | B25J 1/04 294/100 |
| 2,549,731 | A * | 4/1951 | Wattley | G01R 1/06788 294/100 |

(Continued)

*Primary Examiner* — Mark Spisich

(57) ABSTRACT

The drain pipe cleaner plumbing tool is a set of tools that allow an individual to clean a clogged drain and to reduce the likelihood of future blockages. It comprises a cap to replace the retaining nut after the pivot rod and built-in stopper are removed from a sink, a tool that reaches into a drain line all the way to the wall and pulls out foreign material, a mesh drain liner that collects foreign objects near the drain hole where they can be easily removed, and a manual stopper that mates with the mesh drain liner.

13 Claims, 7 Drawing Sheets

(56) References Cited

U.S. PATENT DOCUMENTS

| | | | | |
|---|---|---|---|---|
| 2,947,564 A * | 8/1960 | Winther | ................ | B25J 1/04 |
| | | | | 294/100 |
| 3,449,775 A * | 6/1969 | De Krauze | ............ | E03C 1/262 |
| | | | | 215/364 |
| 3,574,381 A * | 4/1971 | Ocheltree | ................ | B25B 9/00 |
| | | | | 294/94 |
| 4,179,762 A * | 12/1979 | Barnhardt | ............... | E03C 1/282 |
| | | | | 137/247.51 |
| 4,207,631 A * | 6/1980 | Baggey | ................ | E03C 1/264 |
| | | | | 210/238 |
| 4,575,143 A * | 3/1986 | Nast | ................ | B25J 1/04 |
| | | | | 294/100 |
| 4,830,002 A * | 5/1989 | Semm | ................ | A61B 17/2909 |
| | | | | 294/100 |
| 5,267,361 A * | 12/1993 | Lai | ................ | E03C 1/282 |
| | | | | 137/247.51 |
| 5,765,251 A * | 6/1998 | Jones | ................ | B08B 9/0436 |
| | | | | 15/104.32 |
| 6,276,018 B1 | 8/2001 | Leiman | | |
| 7,021,337 B2 | 4/2006 | Markham | | |
| 7,588,053 B2 | 9/2009 | Lundman | | |
| D613,376 S | 4/2010 | Barbu | | |
| 2005/0229985 A1 | 10/2005 | Saxenfelt | | |
| 2008/0315605 A1* | 12/2008 | Shih | ................ | B25J 1/02 |
| | | | | 294/100 |
| 2012/0247519 A1 | 10/2012 | Dondurur | | |
| 2016/0312452 A1* | 10/2016 | Perry | ................ | E03C 1/302 |

* cited by examiner

DRAIN PIPE CLEANER PLUMBING TOOL

CROSS REFERENCES TO RELATED APPLICATIONS

This application claims the benefit of U.S. Provisional Application No. 62/308,676, which was filed Mar. 15, 2016.

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of plumbing equipment, more specifically, a system for cleaning and maintaining the drain of a sink.

Sinks are a common and necessary feature of modern homes. They can often be found in bathrooms, kitchens, and laundry/utility rooms. A typical sink is a basin with a drain hole at the bottom. Generally, sinks provide a faucet for introducing water into the basin and a stopper to prevent the drainage of the water from the basin until such time as the user of the sink has completed their activities. Sinks allow us to collect water to wash our hands, faces, hair, dishes, clothing, pets, and other items. A common feature of modern sinks is a 'pop-up drain stopper' which is a stopper built into the sink and activated by lifting a stopper knob accessible near the faucets. The stopper knob is generally attached to a lift rod and pulling the lift rod up results in the pivoting of a pivot rod located beneath the sink in such a way that a built-in stopper is pulled down into the drain hole. When the user has completed their washing activities they push down on the stopper knob causing the pivot rod to pivot in the opposite direction and causing the built-in stopper to pop up. It has become a common feature of modern sinks that the plumbing beneath the sink provides a pivot hole in the side of the drain pipe through which the pivot rod passes. The pivot rod pivots at this spot and a retaining nut holds the pivot rod in place and provides a water-proof seal.

As useful as they are, sinks are also a major source of frustration for homeowners. This is because over time hair, food particles, dirt, grime, grease, oil, and other material can collect within the plumbing and cause the sinks to drain slowly or to not drain at all. Some features of modern plumbing can compound the problem. The trap (sometimes known as a P-trap due to its shape) provide a low spot in the drainage line for foreign objects to collect. The relatively horizontal run of the P-trap from the sink to the wall provides an additional location where a build-up of material is likely to occur. And finally, the pivot rod and built-in stopper provide obstructions to the flow of water through the drain and any hair or other foreign material in the drainage water is likely to collect on these features and build-up over time.

SUMMARY OF INVENTION

The drain pipe cleaner plumbing tool is a set of tools that allow an individual to clean a clogged drain and to reduce the likelihood of future blockages. It comprises a cap to replace the retaining nut after the pivot rod and built-in stopper are removed from a sink, a tool that reaches into a drain line all the way to the wall and pulls out foreign material, a mesh drain liner that collects foreign objects near the drain hole where they can be easily removed, and a manual stopper that mates with the mesh drain liner.

An object of the invention is to provide a tool that cleans a clogged sink drain in an effective manner.

A further object of the invention is to provide a mesh drain liner that collects foreign material introduced into a drain near the drain hole where they can be easily removed.

Yet another object of the invention to provide a manual stopper that mates with the mesh drain liner.

Another object of the invention is to provide a cap that blocks the pivot rod hole on a drain line after the pivot rod and built-in stopper has been removed from a sink.

These together with additional objects, features and advantages of the drain pipe cleaner plumbing tool will be readily apparent to those of ordinary skill in the art upon reading the following detailed description of the presently preferred, but nonetheless illustrative, embodiments when taken in conjunction with the accompanying drawings.

In this respect, before explaining the current embodiments of the drain pipe cleaner plumbing tool in detail, it is to be understood that the drain pipe cleaner plumbing tool is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the drain pipe cleaner plumbing tool.

It is therefore important that the claims be regarded as including such equivalent construction insofar as they do not depart from the spirit and scope of the drain pipe cleaner plumbing tool. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or' is intended to be inclusive.

Figure 1:
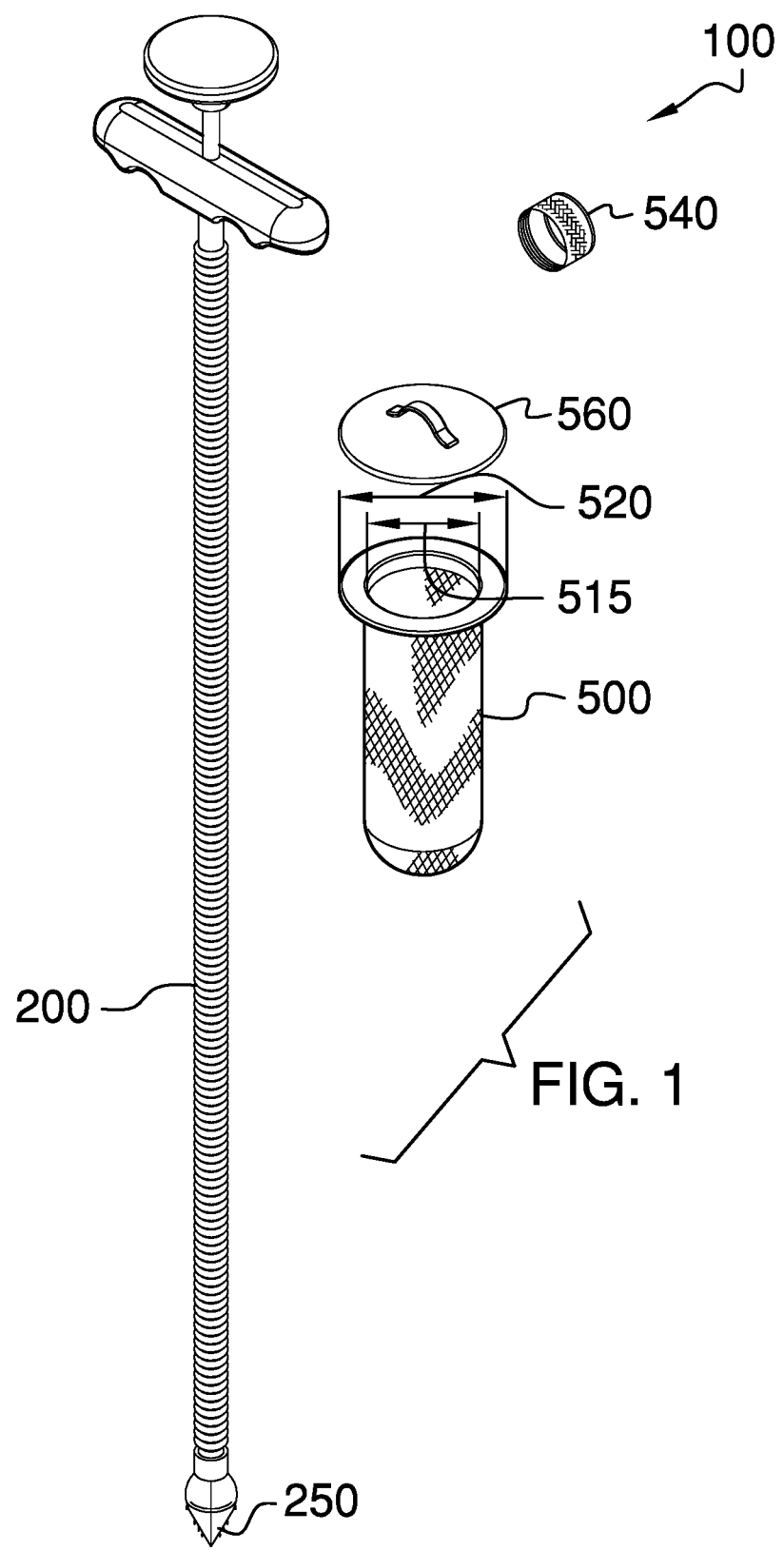
FIG. 1 is a perspective view of an embodiment of the disclosure.
Figure 2:
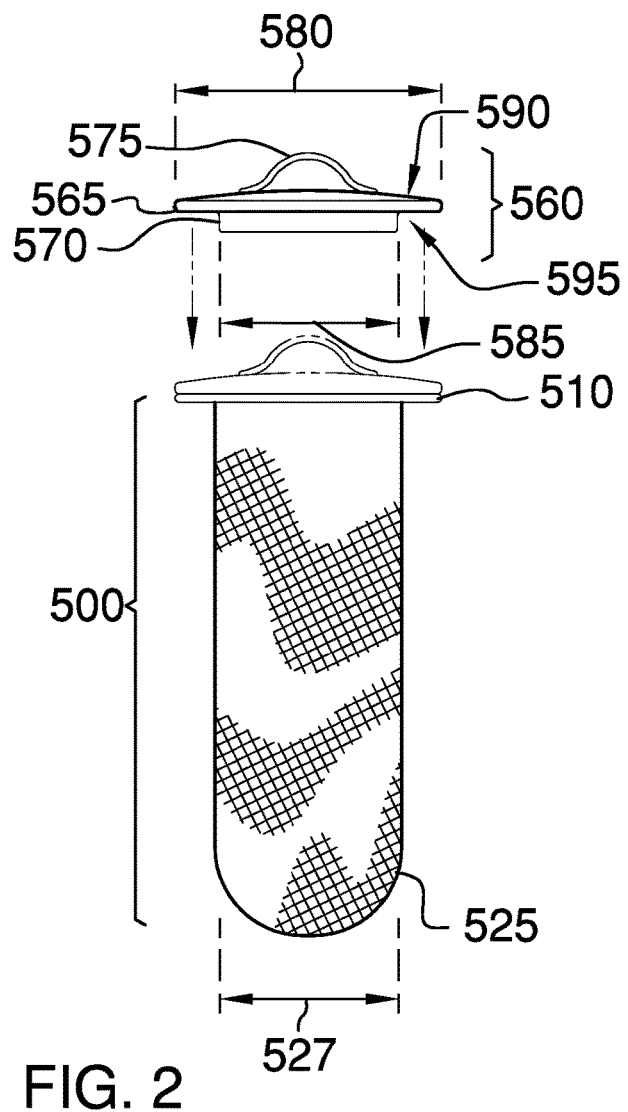
FIG. 2 is a side view of an embodiment of the disclosure showing details of the mesh drain liner.
Figure 3:
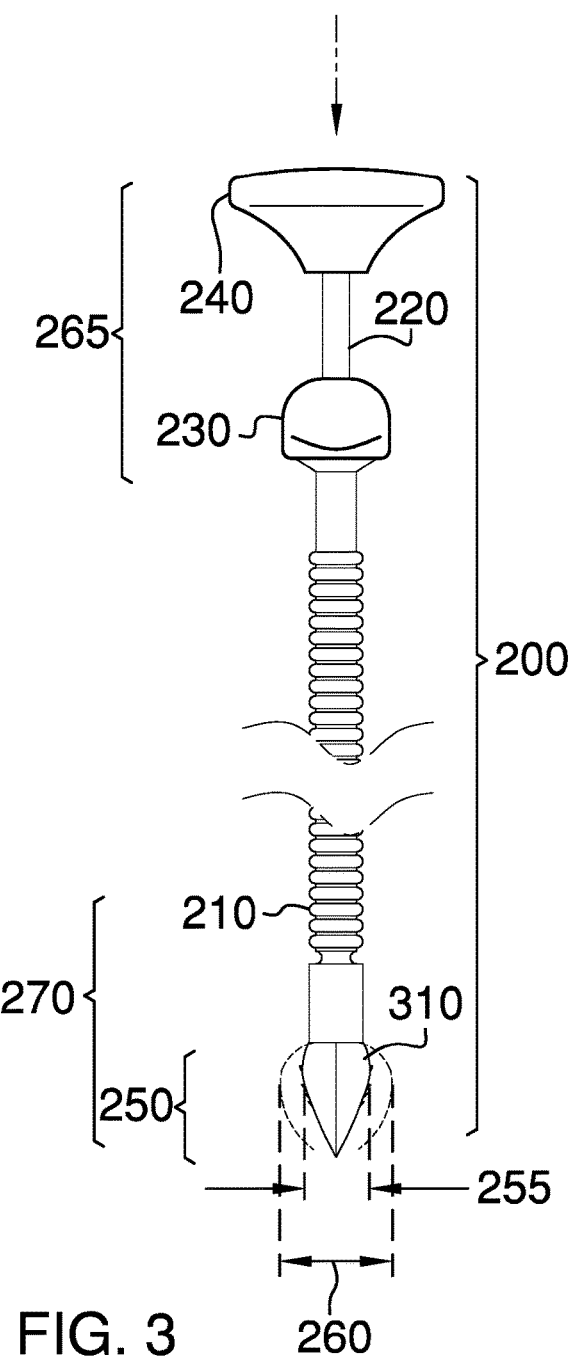
FIG. 3 is a side view of an embodiment of the disclosure showing operational modes of the drain cleaning tool.
Figure 4:
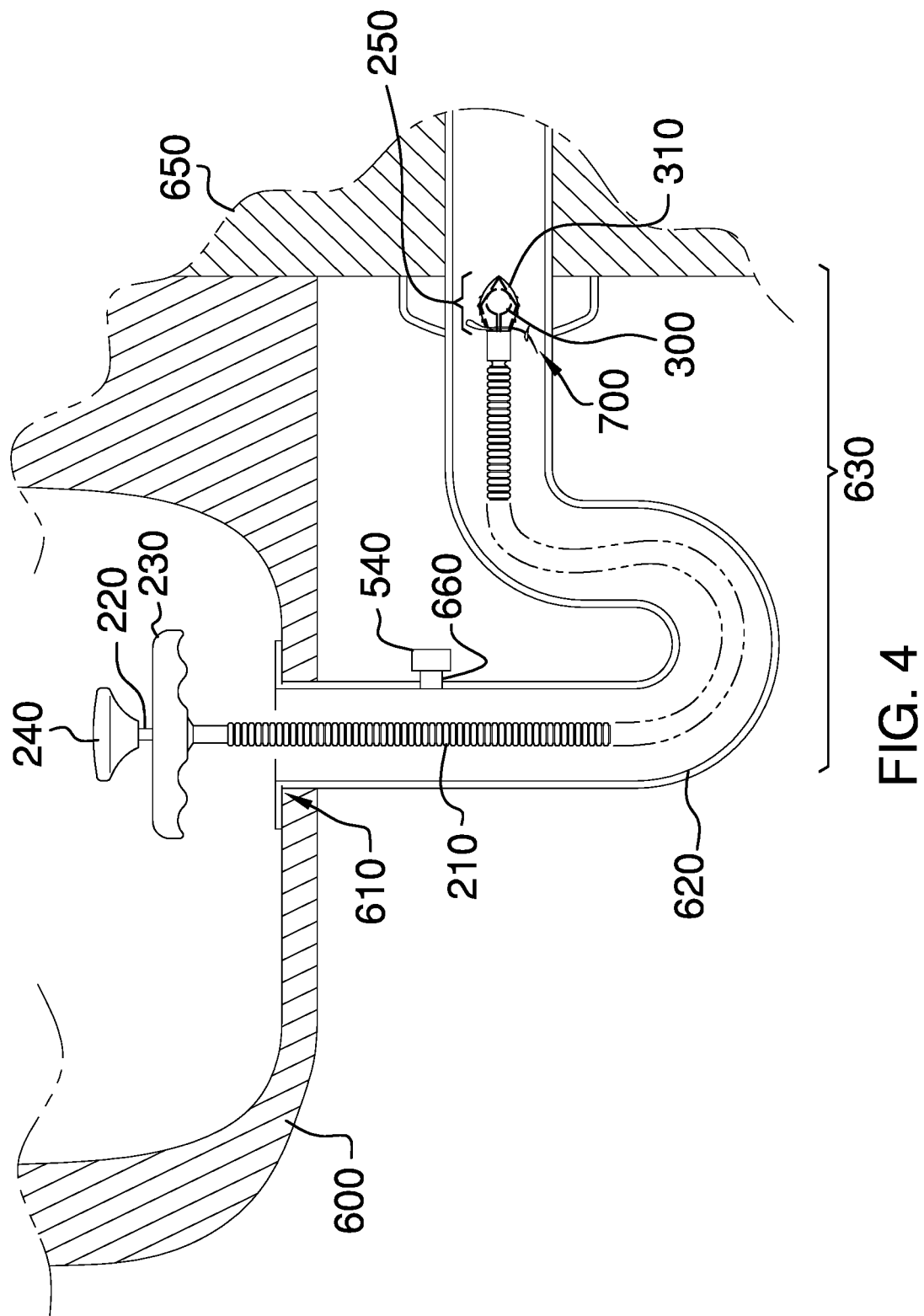
FIG. 4 is a cross-sectional view of a sink and drain pipe illustrating an embodiment of the disclosure in use to clean the drain pipe.
Figure 5:
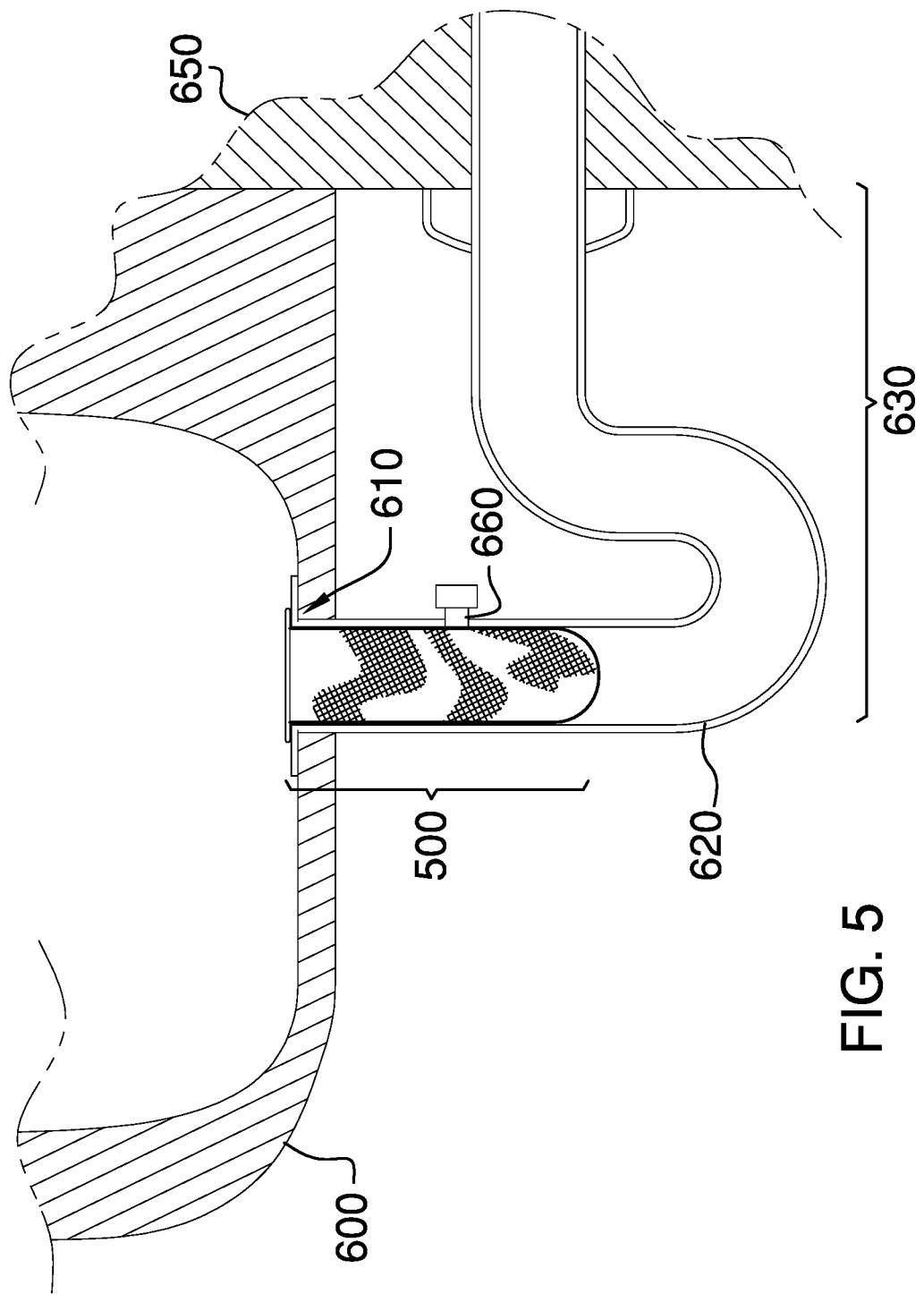
FIG. 5 is a cross-sectional view of a sink and drain pipe illustrating an embodiment of the disclosure across in use to prevent future clogs.
Figure 6:
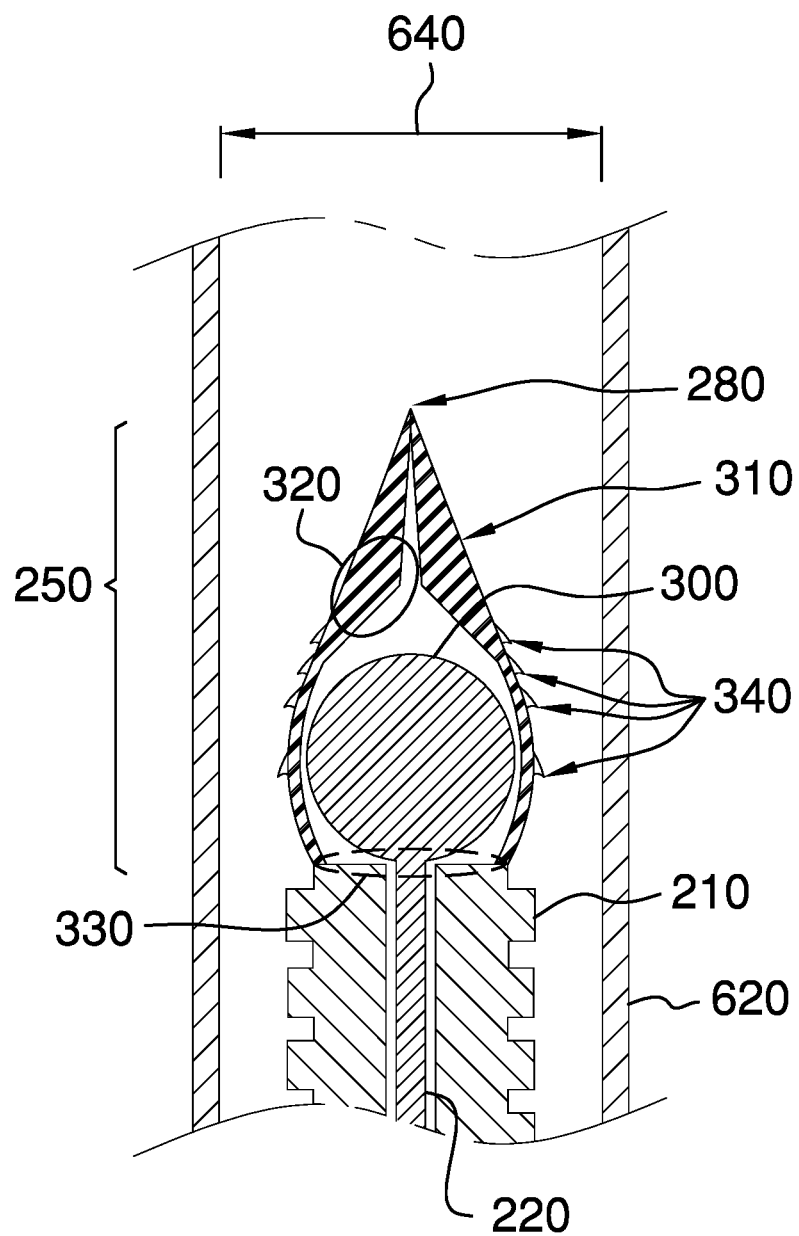
FIG. 6 is a cross-sectional view of an embodiment of the disclosure illustrating the expandable tip in a relaxed state.
Figure 7:
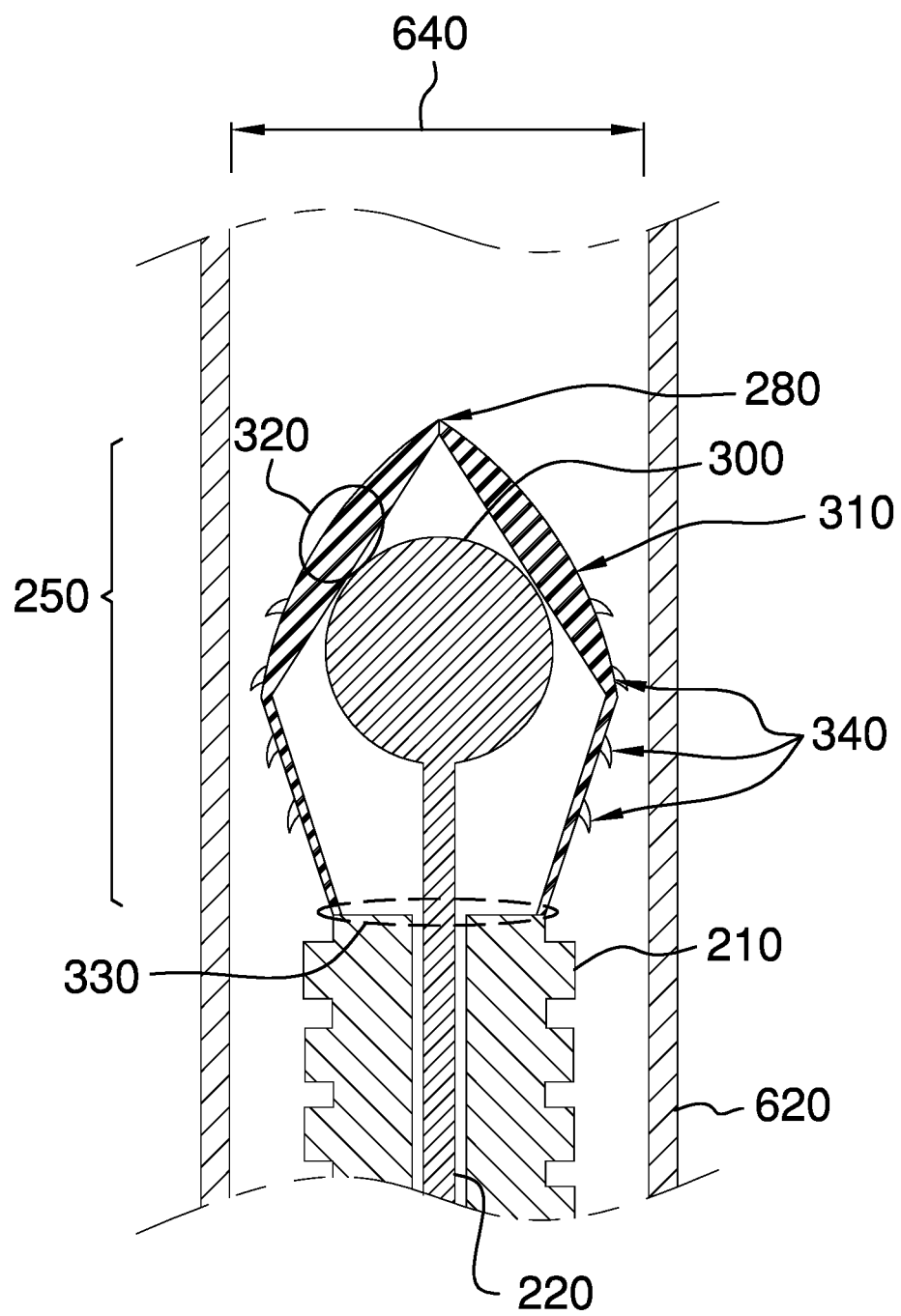
FIG. 7 is a cross-sectional view of an embodiment of the disclosure illustrating the expandable tip in the expanded state.
Figure 8:
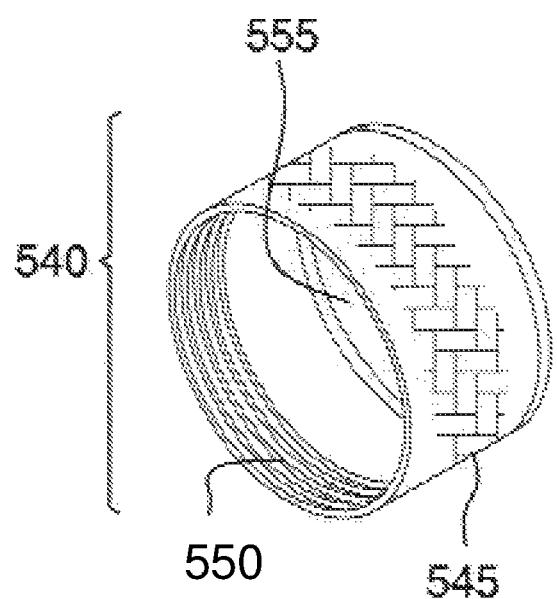
FIG. 8 is a perspective view of an embodiment of the disclosure showing detail of the pivot cap.

Detailed reference will now be made to a first potential embodiment of the disclosure, which is illustrated in FIGS. 1 through 8.

The drain pipe cleaner plumbing tool 100 (hereinafter invention) comprises a drain cleaning tool 200, a mesh drain liner 500, a manual stopper 560, and a pivot cap 540. The drain cleaning tool 200 is inserted into a targeted drain pipe 620 of a sink 600, activated by squeezing an activation handle 240 towards a gripping handle 230, and withdrawn from the targeted drain pipe 620 by pulling on the gripping handle 230 while continuing to squeeze the activation handle 240 towards the gripping handle 230.

The act of squeezing the activation handle 240 towards the gripping handle 230 causes an expandable tip 250 of the drain cleaning tool 200 to enlarge to a size where it substantially fills a third diameter 640 of the targeted drain pipe 620. When activated to substantially fill the third diameter 640 of the targeted drain pipe 620, the act of withdrawing the drain cleaning tool 200 by pulling on the gripping handle 230 while continuing to squeeze the activation handle 240 towards the gripping handle 230 causes the expandable tip 250 to pull foreign material 700 out of the targeted drain pipe 620. Because sinks and drain pipes of various sizes exist, the drain cleaning tool 200 may be designed for the targeted drain pipe 620 and the drain cleaning tool 200 may be one of a family of tools selected for use on a sink of a specific size. The dimensional differences between members of the family may account for differences in drain pipe diameter and/or length of the drain pipe that needs to be cleaned. To be as effective as possible, the drain cleaning tool 200 is designed to reach from a drain hole 610 at the bottom of the sink all the way to a wall 650 through which the targeted drain pipe 620 passes. This allows the drain cleaning tool 200 to access the entire length of a P-trap 630.

The drain cleaning tool 200 comprises an outer tube 210, an inner wire 220, the gripping handle 230, the activation handle, and the expandable tip 250. The outer tube is hollow and may be constructed of a flexible but incompressible material. As a non-limiting example, the outer tube may be constructed from plastic, rubber, corrugated metal tubing, braided metal hose, or a combination thereof. The inner wire 220 is constructed from a flexible but incompressible material. As non-limiting examples, the inner wire may be constructed from copper, aluminum, nylon, or other flexible materials capable of being formed into a strand. The inner wire 220 is not coupled to the outer tube 210 however it may be guided through the outer tube 210 by spacers (not shown) located throughout the length of the outer tube 210. The gripping handle 230 is coupled to the outer tube 210 at a handle end 265 of the drain cleaning tool 200. If may be generally T-shaped and may provide a contoured surface with shallow grooves to match the fingers of a human operator. The activation handle 240 is coupled to the inner wire 220 at the handle end 265 of the drain cleaning tool 200. The physical arrangement of the outer tube 210, the inner wire 220, the gripping handle 230, and the activation handle 240 is such that if the activation handle 240 is pushed towards the gripping handle 230 at the handle end 265 of the drain cleaning tool 200, it has the effect of moving a tip end 270 of the inner wire 220 beyond the tip end 270 of the outer tube 210 at the tip end 270 of the drain cleaning tool 200. The significance of this motion will be explained next.

The expandable tip 250 comprises a expandable head 310 and a wedge 300. The expandable head 310 comprises an envelope of a stretchy material with a thickened portion 320. As a non-limiting example, the expandable head may be constructed from latex rubber. An opening 330 of the expandable head 310 is coupled to the tip end 270 of the outer tube 210. The thickened portion 320 of the expandable head 310 is located at the end of the expandable head 310 that is opposite the opening 330. The wedge 300 is internal to the expandable head 310. The wedge 300 is connected to the tip end 270 of the inner wire 220 of the drain cleaning tool 200 such that when the activation handle 240 is pushed towards the gripping handle 230 on the handle end 265 of the drain cleaning tool 200, the wedge 300 moves farther into the expandable head 310. As the wedge 300 is pushed farther into the expandable head 310 the wedge 300 encounters the thickened portion 320 of the expandable head 310. The shape of the wedge 300 is not critical, it must simply push the inside walls of the expandable head 310 and cause them to separate to the point where the diameter of the expandable head 310 is substantially the same as the third diameter 640 of the targeted drain pipe 620. As non-limiting examples, the wedge 300 may be spherical as shown in the figures or it may be conical.

The expandable head 310 is prevented from pushing forward under the influence of the wedge 300 due to its coupling to the outer tube 210. The action of the wedge 300 moving farther into the expandable head 310 causes the walls of the expandable head 310 to move outward, away from the center of the wedge 300. This has the effect of enlarging the expandable tip 250 of the drain cleaning tool 200 from a first diameter 255 to a second diameter 260. The second diameter 260 is less than the third diameter 640 of the targeted drain pipe 620. A leading point 280 of the expandable tip 250 may narrow to aid the expandable tip 250 in pushing past the foreign material 700 that may be in the targeted drain pipe 620.

When the expandable tip 250 has been enlarged to the second diameter 260 it substantially fills the width of the targeted drain pipe 620. Therefore, if the drain cleaning tool 200 is pulled out of the targeted drain pipe 620 while the expandable tip 250 is held enlarged at the second diameter 260, the expandable tip 250 will pull much of the foreign material 700 along with it. To enhance the ability of the drain cleaning tool 200 to pull the foreign material 700 out of the drain, in some embodiments of the invention the outside surface of the expandable head 310 may comprise a plurality of barbs 340 pointed towards the handle end 265 of the drain cleaning tool 200.

As a non-limiting example, the plurality of barbs 340 may comprise a textured surface of the expandable head 310 or a second material molded into the surface of the expandable head 310. As a further non-limiting example, the textured surface of the expandable head 310 may comprise a texture molded into the surface of the expandable head 310, a roughening of the surface of the expandable head 310 due to a process use after the expandable head 310 is formed, or a series of small cuts or gouges made to the surface of the expandable head 310. To return the expandable tip 250 to the first diameter 255, the activation handle 240 is pulled away from the gripping handle 230 while holding the outer tube 210 stationary.

The mesh drain liner 500 comprises a lip 510 and a basket 525. The lip 510 is a flat ring, which is used to prevent the mesh drain liner 500 from falling into the targeted drain pipe 620. The lip 510 has an inner diameter 515 which is no larger than the third diameter 640 of the targeted drain pipe 620 and an outer diameter 520 which is no smaller than the third diameter 640 of the targeted drain pipe 620. The basket 525 comprises a closed-end, concave tube constructed from a metal or plastic mesh. The basket 525 has a basket diameter 527, which is no larger than the third diameter 640 of the targeted drain pipe 620. The mesh drain liner 500 serves to collect hair and the foreign material 700 in the basket 525 while the foreign material 700 is near the entrance to the targeted drain pipe 620. When a quantity of the foreign material 700 that slows the drainage of water from the sink 600 has been collected, the mesh drain liner 500 may be pulled from the targeted drain pipe 620, emptied, and then re-inserted into the targeted drain pipe 620.

The manual stopper 560 comprises a stopper body 565, a bottom offset 570, and a pull handle 575. The manual stopper 560 is used to prevent water from flowing into the targeted drain pipe 620 when it is desired to hold water in the sink 600. The stopper body has a stopper diameter 580 that is no smaller than the third diameter 640 of the targeted drain pipe 620. The stopper body has the pull handle 575 on a top surface 590 of the stopper body 565. The pull handle 575 is a vertical, looping extension of the stopper body 565, which allows a user to grasp the manual stopper 560. The bottom offset 570 is a circular, vertical extension of a bottom surface 595 of the stopper body 565. The bottom offset 570 is substantially centered on the bottom surface 595 of the stopper body 565. The bottom offset 570 prevents the manual stopper 560 from moving sideways when in use in the sink 600. The bottom offset 570 has an offset diameter 585, which is no larger than the third diameter 640 of the targeted drain pipe 620.

The pivot cap 540 comprises a closed-end nut 545 with an inside thread 550 and a seal 555. The pivot cap 540 is used to cover a pivot hole 660. In order to allow the drain cleaning tool 200 to pass through the targeted drain pipe 620 and to remove obstructions that can act as collection points for hair and the foreign material 700, the invention 100 instructs to remove the components of any existing pop-up drain stopper. As a non-limiting example, this includes removing the clevis, clevis screw, pivot rod, retaining nut, and built-in stopper. (These components are not shown in the figures because they are well known plumbing features and are not a part of the present invention.) The stopper rod and stopper knob may remain in place because to remove them would results in a hole visible from the top of the sink near the faucets. Removal of the pivot rod and retaining nut introduces the pivot hole 660 into the side of the targeted drain pipe 620 through which drainage water could flow. To prevent this undesirable event, the invention 100 comprises the pivot cap 540 to cover the pivot hole 660. In use, the pivot cap 540 is screwed into place covering the pivot hole 660 at the same position formerly occupied by the original retaining nut. The pivot cap 540 is then tightened to assure a good seal.

To use the invention 100, the original pop-up drain stopper is first removed from the sink 600. This may involve removal of the clevis and clevis screw, pivot rod, retaining nut, and built-in stopper. The pivot cap 540 is then screwed into placed as previously described, to prevent water from exiting at the pivot hole 660. The drain cleaning tool 200 is then prepared for use by pulling the activation handle 240 away from the gripping handle 230 while holding the outer tube 210 stationary. This causes the expandable tip 250 to contract to the first diameter 255. The expandable tip 250 of the drain cleaning tool 200 is then inserted into the targeted drain pipe 620 and the outer tube 210 of the drain cleaning tool 200 is pushed as far into the targeted drain pipe 620 as it will go. The gripping handle 230 may be used to help insert the drain cleaning tool 200 into the targeted drain pipe 620. The activation handle 240 is pushed towards the gripping handle 230 using a squeezing action of one hand, causing the expandable tip 250 to enlarge to the second diameter 260. Next the drain cleaning tool 200 is withdrawn from the targeted drain pipe 620 by pulling on the gripping handle 230 while continuing to squeeze the gripping handle 230 and the activation handle 240 together. Once the expandable tip 250 has cleared the targeted drain pipe 620 the expandable tip 250 can be cleared of the foreign material 700 and the process of preparing the drain cleaning tool 200, inserting the drain cleaning tool 200, squeezing the activation handle 240 and the gripping handle 230 together, and withdrawing the drain cleaning tool 200 may be repeated as many times as necessary—as long as the drain cleaning tool 200 is pulling out a substantial amount of the foreign material 700. Finally, the mesh drain liner 500 can be dropped into the targeted drain pipe 620 and the manual stopper 560 can be placed on top of the mesh drain liner 500 to use the sink normally.

With respect to the above description, it is to be realized that the optimum dimensional relationship for the various components of the invention described above and in FIGS. 1 through 8, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A drain pipe cleaner plumbing tool comprising:
a drain cleaning tool;
wherein the drain cleaning tool is inserted into a targeted drain pipe of a sink;
wherein the drain cleaning tool is activated by squeezing an activation handle towards a gripping handle;

wherein the drain cleaning tool is withdrawn from the targeted drain pipe by pulling on the gripping handle while continuing to squeeze the activation handle towards the gripping handle;

wherein squeezing the activation handle towards the gripping handle causes an expandable tip of the drain cleaning tool to enlarge to a size where it substantially fills a diameter of the targeted drain pipe;

wherein withdrawing the drain cleaning tool by pulling on the gripping handle while continuing to squeeze the activation handle towards the gripping handle causes the expandable tip to pull foreign material out of the targeted drain pipe;

wherein the drain cleaning tool comprises an outer tube, an inner wire, the gripping handle, the activation handle, and the expandable tip;

wherein the outer tube is hollow and is constructed of a flexible but incompressible material;

wherein the inner wire is constructed from a flexible but incompressible material;

wherein the inner wire is not coupled to the outer tube;

wherein the inner wire is be guided through the outer tube by spacers located throughout the length of the outer tube;

wherein the gripping handle is coupled to the outer tube at a handle end of the drain cleaning tool;

wherein the activation handle is coupled to the inner wire at the handle end of the drain cleaning tool;

wherein pushing the activation handle towards the gripping handle at the handle end of the drain cleaning tool has the effect of moving a tip end of the inner wire beyond the tip end of the outer tube at the tip end of the drain cleaning tool;

wherein the expandable tip comprises a expandable head and a wedge;

wherein the expandable head comprises an envelope with a thickened portion.

2. The drain pipe cleaner plumbing tool according to claim 1 wherein an opening of the expandable head is coupled to the tip end of the outer tube;

wherein the thickened portion of the expandable head is located at the end of the expandable head that is opposite the opening.

3. The drain pipe cleaner plumbing tool according to claim 2 wherein the wedge is internal to the expandable head;

wherein the wedge is connected to the tip end of the inner wire of the drain cleaning tool such that when the activation handle is pushed towards the gripping handle on the handle end of the drain cleaning tool, the wedge moves farther into the expandable head;

wherein as the wedge is pushed farther into the expandable head the wedge encounters the thickened portion of the expandable head.

4. The drain pipe cleaner plumbing tool according to claim 3 wherein the expandable head is prevented from pushing forward under the influence of the wedge due to a coupling of the expandable head to the outer tube;

wherein the action of the wedge moving farther into the expandable head causes the walls of the expandable head to move outward, away from the center of the wedge;

wherein the walls of the expandable head moving outward has the effect of enlarging the expandable tip of the drain cleaning tool from a first diameter to a second diameter;

wherein the second diameter is less than a third diameter of the targeted drain pipe.

5. The drain pipe cleaner plumbing tool according to claim 4 wherein a leading point of the expandable tip is narrow to aid the expandable tip in pushing past the foreign material that is in the targeted drain pipe.

6. The drain pipe cleaner plumbing tool according to claim 5 wherein withdrawing the drain cleaning tool from the targeted drain pipe while the expandable tip is held enlarged at the second diameter allows the expandable tip to pull the foreign material out of the targeted drain pipe.

7. The drain pipe cleaner plumbing tool according to claim 6 wherein the outside surface of the expandable head comprises a plurality of barbs pointed towards the handle end of the drain cleaning tool to enhance the ability of the drain cleaning tool to pull the foreign material out of the targeted drain pipe.

8. The drain pipe cleaner plumbing tool according to claim 7 wherein pulling the activation handle away from the gripping handle while holding the outer tube stationary allows the expandable tip to shrink to the first diameter.

9. A kit including the drain pipe cleaner plumbing tool according to claim 1 further comprising a mesh drain liner, a manual stopper;

wherein the mesh drain liner comprises a lip and a basket;

wherein the lip is a flat ring which is used to prevent the mesh drain liner from falling into the targeted drain pipe;

wherein the lip has an inner diameter which is no larger than a diameter of the targeted drain pipe;

wherein the lip has an outer diameter which is no smaller than the diameter of the targeted drain pipe.

10. The kit according to claim 9 wherein the basket comprises a closed-end, concave tube constructed from a mesh material;

wherein the basket has a basket diameter which is no larger than the diameter of the targeted drain pipe;

wherein the mesh drain liner serves to collect the foreign material in the basket while the foreign material is near the entrance to the targeted drain pipe;

wherein the mesh drain liner may be pulled from the targeted drain pipe, emptied, and then re-inserted into the targeted drain pipe.

11. The kit according to claim 10 wherein the manual stopper comprises a stopper body, a bottom offset, and a pull handle;

wherein the manual stopper is used to prevent water from flowing into the targeted drain pipe when it is desired to hold water in the sink;

wherein the stopper body has a stopper diameter that is no smaller than the diameter of the targeted drain pipe;

wherein the stopper body has the pull handle on a top surface of the stopper body.

12. The kit according to claim 11 wherein the pull handle is a vertical, looping extension of the stopper body which allows a user to grasp the manual stopper;

wherein the bottom offset is a circular, vertical extension of a bottom surface of the stopper body;

wherein the bottom offset is substantially centered on the bottom surface of the stopper body;

wherein the bottom offset prevents the manual stopper from moving sideways when in use in the sink;

wherein the bottom offset has an offset diameter which is no larger than the diameter of the targeted drain pipe.

13. A kit including the drain pipe cleaner plumbing tool according to claim 1 further comprising a pivot cap;

wherein the pivot cap comprises a closed-end nut with an inside thread and a seal;

wherein the pivot cap is used to cover a pivot hole.

* * * * *